United States Patent [19]

Custer

[11] Patent Number: 4,748,299

[45] Date of Patent: May 31, 1988

[54] LEVEL SENSING SYSTEM WITH LATCHING DEVICE

[75] Inventor: Craig S. Custer, Pompano Beach, Fla.

[73] Assignee: CTE Chem Tech Equipment Corp., Deerfield Beach, Fla.

[21] Appl. No.: 77,453

[22] Filed: Jul. 24, 1987

[51] Int. Cl.$^4$ ............................................. H01H 35/18
[52] U.S. Cl. ................................... 200/84 C; 73/319; 335/207; 340/624
[58] Field of Search ............... 340/612, 618, 623, 624; 335/205, 207, 151, 153, 154; 73/308, 313, 319, 322.5, DIG. 5; 200/61.2, 84 R, 84 C

[56] References Cited

U.S. PATENT DOCUMENTS

| | | | |
|---|---|---|---|
| 3,437,771 | 4/1969 | Nusbaum | 200/84 C |
| 3,564,171 | 2/1971 | Hammond | 335/205 |
| 3,868,485 | 2/1975 | Sykes | 200/61.2 |
| 4,064,755 | 12/1977 | Bongart | 73/313 |
| 4,191,951 | 3/1980 | Fuzzell | 200/84 C |
| 4,442,405 | 4/1984 | Andrejasich | 73/313 |
| 4,609,796 | 9/1986 | Bergsma | 340/624 |

FOREIGN PATENT DOCUMENTS 2643355  3/1978  Fed. Rep. of Germany .... 200/84 C

Primary Examiner—G. P. Tolin
Attorney, Agent, or Firm—Melvin K. Silverman

[57] ABSTRACT

A liquid level sensing means for use in a tank or the like, adapted to hold a liquid which is partially withdrawn and/or replenished from time-to-time. Disposed within the liquid is a buoyant, upright, hollow reed switch-like float element having a longitudinal axis parallel with the direction of movement of the liquid level within the tank. The switch element is adapted to float upon the surface of the liquid whose level is to be sensed. It is provided with an upper reed and a lower reed, each in alignment with the longitudinal axis of the float element. The upper reed is rigidly secured to the upper end of an envelope of the float element, while the lower reed thereof is spring biasly secured to the lower end of the float element envelope. At a location medially between the upper and lower ends of the float element envelope, there exists an area of overlap between the unsecured ends of the upper and lower reeds respectively. At the upper end of the reed switch envelope is provided a calibrating magnet which is a pole magnet having a magnetic axis substantially in alignment with the longitudinal axis of the envelope of the float element. It is secured proximally to the top of the envelope and within magnetic proximity to the upper reed. The calibrating magnet will induce in the upper reed a magnetic axis and field opposite to the magnetic axis and field of the calibrating magnet. This will in turn induce a magnetic axis and field in the lower reed opposite to that of the upper reed, but the same in direction to that of the calibrating magnet.

1 Claim, 2 Drawing Sheets

LEVEL SENSING SYSTEM WITH LATCHING DEVICE

BACKGROUND OF THE INVENTION

The present invention relates to the area of liquid level sensing means and, more particularly, to the use of particular magnetic field geometries to obtain an advantageous pattern of actuation by a reed switch float element.

The prior art, as best known to the inventor, is set forth in U.S. Pat. No. 3,437,771 (1969) to Nusbaum, entitled Liquid Level Sensing Device. Said patent, while sharing some of the objectives of the instant invention, employs a different structure and magnetic geometry and, thereby, does not offer the same simplicity of structure, and economy and cost of construction, as does the liquid level sensing means herein disclosed.

Other relevant prior art known to the inventor consists of U.S. Pat. Nos. 3,564,171; 3,868,485; 4,064,755; 4,191,951; and 4,609,796.

SUMMARY OF THE INVENTION

The present invention relates to a liquid level sensing means for use in a tank or the like, adapted to hold a liquid which is partially withdrawn and/or replenished from time to time. Disposed within the liquid is a buoyant, upright, hollow reed switch-like float element having a longitudinal axis substantially parallel with the direction of movement of the liquid level within said tank. The switch element is adapted to float upon the surface of the liquid whose level is to be sensed. It is provided with an upper reed and a lower reed, each in substantial alignment with the longitudinal axis of the float element. The upper reed is rigidly secured to the upper end of an envelope of the float element while the lower reed thereof is spring biasly secured to the lower end of the float element envelope. At a location medically between the upper and lower ends of the float element envelope, there exists an area of overlap between the unsecured ends of the upper and lower reeds respectively. At the upper end of the reed switch envelope is provided a calibrating magnet which is a pole magnet having a magnetic axis substantially in alignment with the longitudinal axis of the envelope of the float element. It is secured proximally to the top of the envelope and within magnetic axis and field of said calibrating magnet. This will in turn induce a magnetic axis and field in said lower reed opposite to that of said upper reed, but the same in direction to that of said calibrating magnet. The unsecured ends of said upper and lower reeds of the reed switch are normally separated by a radial distance sufficient to render the attractive magnetic field therebetween incapable of causing a closure between said unsecured ends of the reeds.

In the wall of the tank holding the liquid is provided a plurality of level sensing magnets, each of said level sensing magnets comprising a pole magnet having a magnetic axis and direction substantially parallel to the longitudinal axis of said reed switch envelope and having a magnetic polarity opposite in direction to that of said calibrating magnet, however, in like direction of that of said upper element of said reed switch.

As the level of the liquid to be measured changes, the movement of the buoyant reed switch envelope, and the rate of said movement, may be measured in terms of the magnetic effect of said level sensing magnets upon the closure, or lack thereof, of contact points of said reed switch. More particularly, as the reed switch approaches a north (bottom) side of a level sensing magnet, a closure of the reed switch contacts will occur, while an approach by the reed switch to a south (upper) side of a level sensing magnet will bring about an opening of the reed switch contacts. The closure point of the reed switch may be externally regulated through change of the strength of the field of the external calibration magnet.

It is accordingly an object of the present invention to provide an improved level sensing system and means.

Another object of the invention is to provide a novel liquid level sensing means employing one or more magnetically calibrated reed switches or the like to thereby eliminate the need for electronic circuitry for the measurement of fluid level changes and the rate of such changes.

It is a further object to provide a level sensing means of the above type having, on the reed switch element, means for externally calibrating the actuation point of the internal reeds of the switch.

The above and yet other objects and advantages of the present invention will become apparent from the hereinafter set forth detailed description of the invention, the drawings, and claims appended herewith.

BRIEF DESCRIPTION OF THE INVENTION

DETAILED DESCRIPTION OF THE INVENTION

Figure 2:
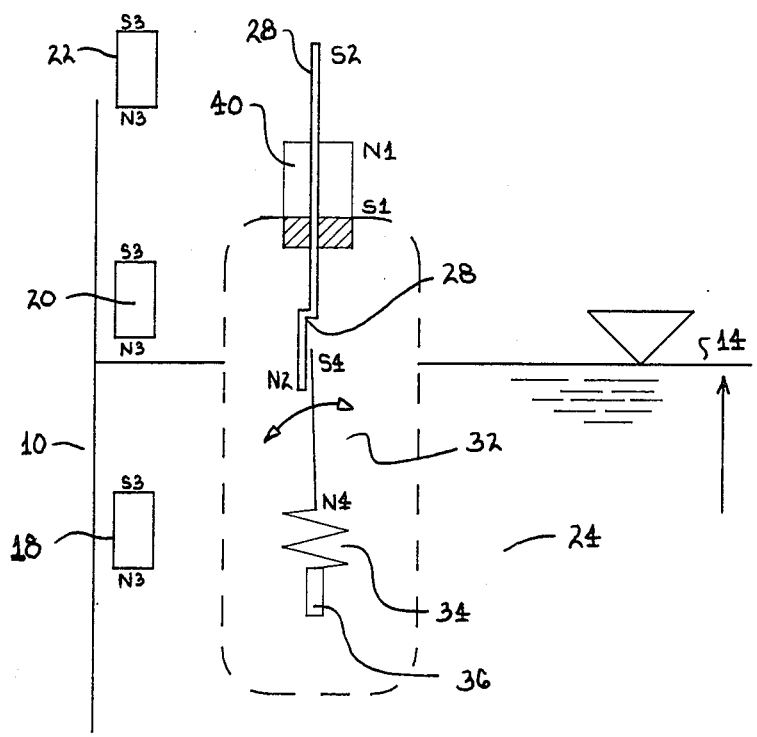
FIG. 2 is a cross-sectional, schematic illustration of the type of FIG. 1, however, showing the open ends of the internal reed switch elements in magnetic proximity to a lower end of a level sensing magnet.
Figure 3:
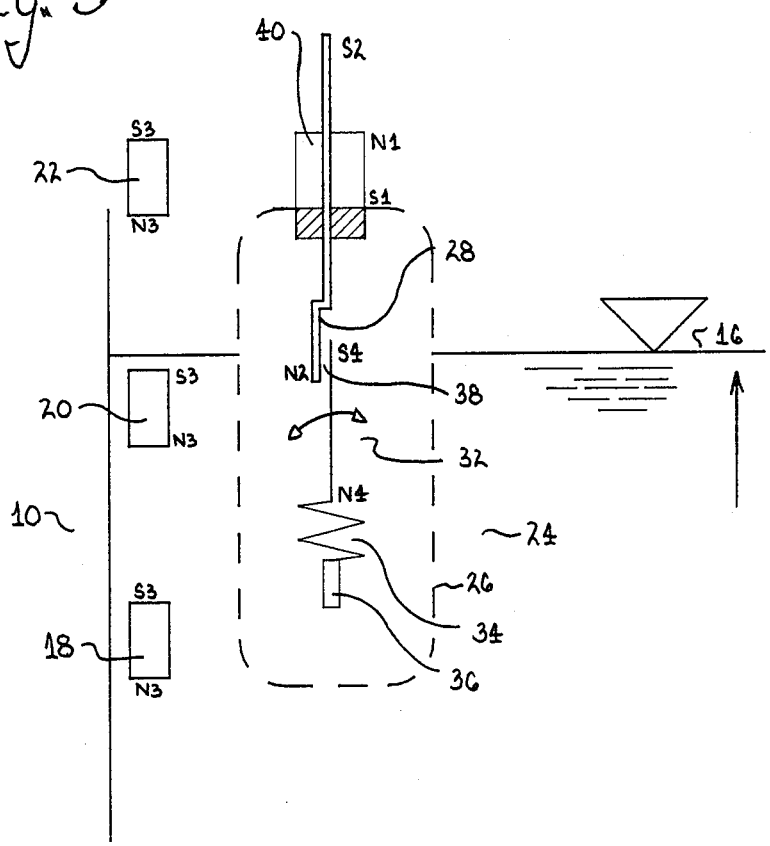
FIG. 3 is an illustration of the type of FIGS. 1 and 2 above, however, showing the free ends of the internal reed elements in magnetic proximity to an upper end of the level sensing magnet.

With reference to the figures, there is shown the inventive liquid level sensing system and, more particularly, there is shown a tank 10 which is adapted to hold a liquid which may be partially withdrawn or replenished from time-to-time. In the schematic view of FIG. 1, the liquid level is shown at a first level 12, whereas, as is more fully described below, the illustration of FIG. 2 illustrates the liquid level at a second level 14, and the illustration of FIG. 3 illustrates the liquid level at a third level 16.

Within the wall of said tank 10, are provided a plurality of level sensing pole magnets 18, 20 and 22. In practice it is to be appreciated that a much larger number than three sensing magnets may be provided. Each of said magnets are secured in uniform relative positions within said tank and, for example, may be secured to the wall of the tank or within a vertical pole or like means within the tank 10. As may be noted from the figures, each of said level sensing magnets 18, 20 and 22 comprise pole magnets having magnetic axes which are of like polarity and which axes are in substantial co-alignment. The magnetic poles of the sensing magnets are, in the figures, denoted as N3 S3.

This description will, for purposes of simplicity, relate to the magnetic interaction of the below-described sensing system to level sensing magnet 20. However, it is to be appreciated that like considerations apply when the inventive sensing means passes through the magnetic field of any of the level sensing magnets shown in the figures.

Figure 1:
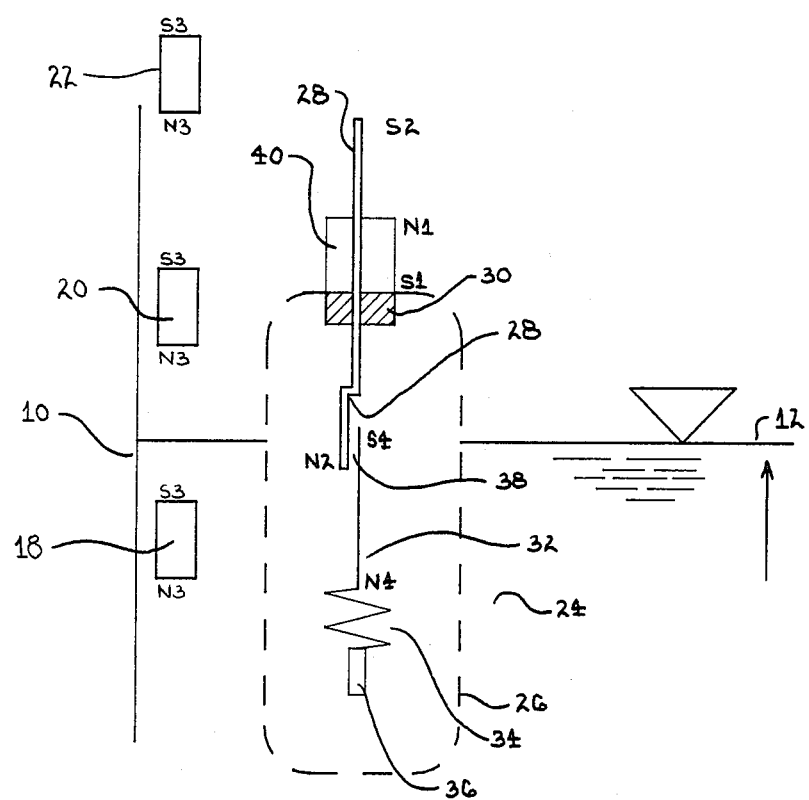
FIG. 1 is an axial schematic view of the invention level sensing system illustrating the operation of the reed switch elements when the same are outside of the magnetic proximity of the level sensing magnets.

In FIG. 1, there is shown a reed switch 24 having thereabout a buoyant envelope 26. Within said envelope 26 is an upper reed element 28 which is axially rigidly secured within said envelope 26 from the top thereof at rigid connection 30. In a preferred embodiment, said upper reed element will extend through envelope 26 in the manner shown in the figures, although it is to be appreciated that the present invention may be practiced without upper reed element 28 so extending.

There is further provided, within said envelope 26, a lower reed element 32 which is axially secured within said envelope 26 by a radial spring of constant value 34 from the bottom of said envelope from a securement plate 36 therein. By virtue of the above arrangement, it may, from the figures, be noted that said upper and lower reed elements 28 and 32 respectively, at the free ends thereof, define a segment of axial overlap, and of radial displacement, that is, the open ends N2 and S4 of said reed elements 28 and 32 will, absent the application of external forces or fields, be separated from each other by a radial displacement 38. It is to be noted that said radial displacement 38 is smaller in dimension than is the length of the segment of axial overlap between the open ends of reed elements 28 to 32.

As a central aspect of the present inventive system, there is, upon or about the axis of envelope 26, provided a compensating magnet 40 which, in a preferred embodiment, is placed on top of envelope 26 and, most importantly, is in magnetic proximity to upper reed element 28. As may be noted from the figures, compensating magnet 40 defines a pole magnet having a magnetic axis denoted as N1-S1. This magnetic axis is co-parallel and co-directional with the magnetic axes of said level sensing magnets 18, 20 and 22.

As a result of positioning of said compensating magnet 40 and its magnetic axis N1-S1 about said first reed element 28, there will be induced into said upper reed element a magnetic axis having a magnetic polarity S2-N2, which is opposite to that of said compensating magnet 40. Further, said magnetic axis S2-N2 of upper reed element 28 will induce into lower reed element 32 a magnetic axis and polarity S4 N4 which is opposite to the magnetic polarity of said upper reed element 28, but which is the same as the magnetic polarity of said compensating magnet 40 and of said level sensing magnet 20.

As a consequence of the above defined magnetic geometry, the following will occur at said radial displacement 38 representing the opening between the free ends N2-S4 of internal reed elements 28 and 32:

When said envelope 28 is beyond the magnetic proximity of any of the level sensing magnets, this being the condition illustrated in FIG. 1, the radial component of spring-constant value 34 will be sufficient to enable lower reed element 32 to overcome the magnetic attraction between the free ends N2-S4 of the internal reed elements, thereby keeping said free ends in an open, unclosed state.

As the liquid level rises, as is shown in FIG. 2, the ends N2-S4 of the internal reed elements will approach pole N3 of level sensing magnet 20, eventually entering the magnetic proximity thereof.

The effect of pole N3 of level sensing magnet 20 will be that of simultaneously repelling end N2 of upper reed element 28 and of attracting end S4 of lower reed element 32 such that end N2 of element 28 and S4 of element 32 will be pulled in the direction of each other, overcoming the radial component of spring-constant value 34 with a resulting closure of leads N2 and S4 as is shown in FIG. 2. This condition will continue as liquid level 14 maintains ends N2 and S4 in the magnetic proximity of end N3 of magnet 20.

If the water level increases to the level 16 shown in FIG. 3, ends N2 and S4 will pass out of the magnetic proximity of pole N3 of magnet 20 into the magnetic proximity of pole S3 of 20. Said pole S3 will magnetically attract end N2 of element 28 and repel end S4 of 32 thereby providing assistance to the radial component of spring constant value 34 with, as a result, ends N2 and S4 returning to an open condition. Such opening and closing, including the sequencing and velocity of the same, can be electronically measured through the output end S2 of upper reed element 28. As well, other state-of-the-art devices such as a hall effect transistor can be employed to monitor changes in the magnetic field within envelope 26 to thereby record changes occurring at open ends N2-S4 of the reed switch System.

It is to be appreciated that the actuation point of the N2-S4 closure can be regulated by changing the magnetic strength of magnetic axis N1-S1 of compensating magnet 40. Similarly, the radial or transverse distance of the axis of envelope 26 from the axis of level sensing magnets 18, 20 and 22, will similarly effect the actuation point. Also, the magnetic properties of the liquid to be measured must also be taken into account in the process of calibrating the instant liquid leveling system.

It is to be further appreciated that, as an alternate embodiment of the invention, that the above-described need assembly may be kept stationary while said vessel 10 is moved. Thereby, a means of measuring the movement of vessel 10 can be accomplished.

While there have been shown and described the preferred embodiment of the present invention, it will be understood that the invention may be embodied otherwise than as herein specifically illustrated or described and that within said embodiments, certain changes in the detail and construction, and the form of arrangement of the parts may be made without departing from the underlying idea or principles of this invention within the scope of the appended claims.

Having thus described my invention, what I claim as new, useful and non-obvious and, accordingly, secure by Letters Patent of the United States is:

1. A liquid level sensing system, comprising:
   (a) a tank or the like adapted to hold a liquid which is partially withdrawn or replenished from time to time;
   (b) a plurality of level sensing pole magnets secured in uniform relative vertical positions within said tank, each of said pole magnets having magnetic axes of like directional polarity;
   (c) within said tank, an elongate reed switch having a buoyant envelope thereabout and having a top and a bottom, said reed switch comprising an upper reed element, axially rigidly secured within said envelope from the top thereof, and a lower reed element axially secured by a radial spring of constant value from the bottom of said envelope, wherein opposite ends of said reed elements are unsecured, free ends defining an axial segment of radially-displaced, overlap, said radial displacement being smaller in dimension than said segment of axial overlap;

(d) a compensating magnet secured in magnetic proximity to said upper reed element, said compensation magnet having a magnetic axis co-parallel and co-directional with the magnetic axis of said level sensing magnest, said compensating magnet inducing in said upper reed element a magnetic axis and polarity opposite that of said compensating magnet and of said upper reed element, thereby inducing into said lower reed element a magnetic axis and polarity opposite to that of said upper reed element and thereby the same as the polarity of said compensating magnet and of said level sensing magnets, whereby, when said envelope of said reed switch is beyond the magnetic proximity of any of said level sensing magnets, the radial component of said spring constant value, securing said lower reed element at its fixed end, will overcome the normal magnetic attraction between said free ends of said upper and lower reed elements to thereby maintain said reed elements in an open state and, further whereby, movement of said envelope into the proximity of one of said level sensing magnets will cause the mutual contacting of said free ends of said reed elements when said ends become magnetically proximal to that pole of the proximal level sensing magnet that is like in polarity to the free end of said upper reed element, and, conversely, will cause the opening of said free ends of said reed elements when said free ends are magnetically proximal to the pole of said proximal level sensing magnet that is opposite to polarity of the free end of said upper reed element, wherein the event, direction and velocity of said reed switch passing a particular level sensing magnet can be monitored from changes in the magnetic field geometry within the reed switch as well as from direct current flow monitoring within the elements of the reed switch.

* * * * *